United States Patent
Juzkow

(10) Patent No.: US 11,233,272 B2
(45) Date of Patent: Jan. 25, 2022

(54) ZERO FLAMMABILITY ELECTROLYTE FOR LITHIUM-ION CELL

(71) Applicant: NIO USA, Inc., San Jose, CA (US)

(72) Inventor: Marc W. Juzkow, Livermore, CA (US)

(73) Assignee: NIO USA, INC., San Jose, CA (US)

( * ) Notice: Subject to any disclaimer, the term of this patent is extended or adjusted under 35 U.S.C. 154(b) by 119 days.

(21) Appl. No.: 16/561,412

(22) Filed: Sep. 5, 2019

(65) Prior Publication Data

US 2020/0136187 A1 Apr. 30, 2020

Related U.S. Application Data

(60) Provisional application No. 62/752,846, filed on Oct. 30, 2018.

(51) Int. Cl.
| | |
|---|---|
| *H01M 10/0569* | (2010.01) |
| *H01M 10/0525* | (2010.01) |
| *H01M 4/525* | (2010.01) |
| *H01M 4/505* | (2010.01) |
| *H01M 10/0567* | (2010.01) |

(52) U.S. Cl.
CPC ....... *H01M 10/0569* (2013.01); *H01M 4/505* (2013.01); *H01M 4/525* (2013.01); *H01M 10/0525* (2013.01); *H01M 10/0567* (2013.01)

(58) Field of Classification Search
None
See application file for complete search history.

(56) References Cited

U.S. PATENT DOCUMENTS

| | | | | |
|---|---|---|---|---|
| 6,210,835 | B1 * | 4/2001 | Arai | H01M 10/052 429/231.95 |
| 6,465,135 | B1 * | 10/2002 | Nishimura | H01B 1/122 429/309 |
| 8,795,903 | B2 * | 8/2014 | Smart | H01M 10/0569 429/332 |
| 9,947,961 | B2 | 4/2018 | Bandhauer | |
| 10,587,008 | B2 * | 3/2020 | Takahashi | H01M 10/0525 |
| 2007/0054186 | A1 * | 3/2007 | Costello | H01M 10/0569 429/200 |

(Continued)

FOREIGN PATENT DOCUMENTS

CN 103456993 A * 12/2013 ............. Y02E 60/10

OTHER PUBLICATIONS

"3M™ Novec™ 7600 Engineered Fluid," 3M, 2007, 6 pages.

(Continued)

*Primary Examiner* — Magali P Slawski
*Assistant Examiner* — Bartholomew A Hornsby
(74) *Attorney, Agent, or Firm* — Sheridan Ross P.C.

(57) ABSTRACT

An electrolyte for a lithium-ion cell, comprises an organic solvent mixture comprising: (a) a hydrofluorinated ether base solvent to dissolve a lithium salt; (b) a fluorinated linear and/or cyclic ester co-solvent to form an SEI layer on a surface of the active materials; and (c) a fluorinated linear and/or cyclic ester co-solvent having a viscosity less than a viscosity of each of the hydrofluorinated ether base solvent and SEI-layer forming fluorinated linear and/or cyclic ester co-solvent to reduce a viscosity of the organic solvent mixture and a lithium salt dissolved in the organic solvent mixture.

21 Claims, 1 Drawing Sheet

(56) References Cited

U.S. PATENT DOCUMENTS

2011/0020700 A1* 1/2011 Iwaya ............... H01M 10/4235
   429/200
2013/0337338 A1* 12/2013 Tikhonov .......... H01M 10/0567
   429/326

OTHER PUBLICATIONS

"1,1,1,2,3,3-hexafluoro-4-(1,1,2,3,3,3-hexafluoropropoxy)-pentane," chem Spider, Royal Society of Chemistry, Jul. 2018, retrieved from http://www.chemspider.com/Chemical-Structure.28558487.html, 3 pages.

* cited by examiner

ZERO FLAMMABILITY ELECTROLYTE FOR LITHIUM-ION CELL

CROSS REFERENCE TO RELATED APPLICATION

The present application claims the benefits of U.S. Provisional Application Ser. No. 62/752,846, filed Oct. 30, 2018, entitled "ZERO FLAMMABILITY ELECTROLYTE FOR LITHIUM-ION CELL", which is incorporated herein by this reference in its entirety.

FIELD

The disclosure relates generally to lithium ion cells and particularly to lithium ion cells comprising electrolytes comprising one or more non-ionic liquid solvents.

BACKGROUND

Lithium-ion cells have internal components with high flammability. Numerous fire incidents involving lithium-ion cells in a variety of systems from mobile phones to laptop computers, and hoverboards, to electric vehicles have occurred. While the smaller batteries can cause property damage, injury and even death, the risk to the driver, passengers and first responders is increased due to the sheer size of the EV battery. Although the number of EV fires is very low, particularly compared to ICE vehicles where thousands of vehicles burn monthly, electric vehicle fires can be spectacular and almost always make the news, thus hurting the EV industry. A non-flammable lithium-ion cell technology is needed.

Work has been done in the past using hydrofluoroethers (HFE) as lithium-ion cell solvents however as they are non-polar, they typically require a unique lithium salt with a weak ionic bond to dissolve in the solvent system. Abuse tolerance, particularly with low or no flammability, and good performance were found.

The problem with this lithium salt, known as LiBETI, is that it is very expensive due to its large number of fluorine atoms and its high toxicity and bioaccumulation. Use of the industry standard $LiPF_6$ salt would not increase the cost or result in additional toxicity in lithium-ion cells but it cannot be dissolved in available HFE fluids.

The second issue with the prior art was the requirement of a uniform solid-electrolyte interface (SEI) layer on the surface of the active materials. Flammable linear and cyclic esters with low flash points, were required which led to electrolyte solutions that were not 100% non-flammable.

Other solutions to the flammability issue with lithium-ion cells include the use of ionic liquids but these have poor performance particularly at low temperatures. Flame retardants have been tested but the chemicals can break down over time during use and lose their capacity for controlling flames.

SUMMARY

These and other needs are addressed by the various aspects, embodiments, and configurations of the present disclosure.

The non-aqueous electrolyte can be non-flammable by using a mixture of highly fluorinated ether and/or ester solvents for the lithium salt. Typically, at least about 80 mole %, more typically at least about 85 mole %, more typically at least about 90 mole %, even more typically at least about 95 mole %, and more typically about 100 mole % of the solvents in the electrolyte are fluorinated solvents.

The individual solvent(s) in the electrolyte can have a high degree of fluorination. For example, about 50% or more, more typically about 75% or more, more typically about 85% or more, more typically about 90% or more, more typically about 95% or more of the carbon-noncarbon and/or nitrogen-noncarbon bonds (excluding the carbon-oxygen and nitrogen-oxygen bonds) can be carbon-fluorine or nitrogen-fluorine bonds, respectively, and more typically the solvent(s) are fully or 100% fluorinated. In many applications, more than 50% of the carbon-noncarbon and/or nitrogen-noncarbon bonds (excluding the carbon-oxygen and nitrogen-oxygen bonds) are carbon-fluorine or nitrogen-fluorine bonds, respectively, and less than 50% are carbon-hydrogen or nitrogen-hydrogen bonds, respectively.

The solvent mixture can include one or more other materials including sulfones, organosilicons, silanes and flame retardants.

In addition to being non-flammable, another important benefit of a highly fluorinated solvent system can be its enhanced oxidative stability, allowing the use of high voltage cathodes up to 5.0V. Fluorinated materials are ideally suited due to the inherent thermodynamic stability of the C—F bond. These include the spinel type materials: $LiM_xMn_{2-x}O_4$ (where M=Ni, Fe, Cr, Co and x is 0 to 1.0, more typically 0.4 to 0.6) and phospho-olivine type materials: $LiMPO_4$ (where M=Co, Mn, Ni, V). Specific compositions of high voltage cathodes that can be employed with the electrolyte of this disclosure include $LiNi_{0.5}Mn_{1.5}O_4$ and $LiCoPO_4$.

The present disclosure can provide a number of advantages depending on the particular configuration. Unlike other HFE solvent-based electrolytes, the electrolyte can use the industry standard $LiPF_6$ salt, thereby not increasing the cost or resulting in additional toxicity in the lithium-ion cell, while providing high conductivity. The electrolyte can provide a uniform solid-electrolyte interface (SEI) layer on the surface of the active materials in the complete or substantial absence of flammable linear and cyclic esters. The cell can have high performance, particularly at low temperatures, due to the complete or substantial absence of ionic liquids.

These and other advantages will be apparent from the disclosure of the aspects, embodiments, and configurations contained herein.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

The Organic Solvent Formulation

Figure 1:
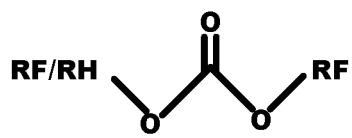
FIG. 1 depicts a chemical structure of a solvent according to some embodiments of the present disclosure.

The mixture of organic solvents in the organic solvent formulation can include a hydrofluoroether (HFE) base solvent, such as PF-7600, manufactured by 3M™, which has the molecular formula: $CF_3CFHCF_2OCH(CH_3)CF_2CFHCF_3$. PF-7600, previously known as Novec™ 7600, commonly has a boiling point of more than about 100 degrees Celsius and more commonly of about 130 degrees Celsius; a pour point of commonly more than about 75 degrees Celsius and more commonly of about 98 degrees Celsius; a liquid density @ 25 degrees Celsius commonly ranging from about 1250 to about 1750 $kg/m^3$ and more commonly of about 1540 $kg/m^3$; a coefficient of expansion commonly ranging from about 0.00100 to about 0.00150 $K^{-1}$ and more commonly of about 0.00114 $K^{-1}$; a latent heat of vaporization @ 1 atmosphere commonly ranging from about 100 to about 125 kJ/kg and more commonly of about 115.6 kJ/kg; a surface tension commonly ranging from about 10 to about 25 dynes/cm and more commonly of about 17.7 dynes/cm; a kinematic viscosity 25 degrees Celsius commonly ranging from about 0.75 to about 1.50 cSt and more commonly of about 1.07 cSt; a critical temperature commonly ranging from about 200 to about 300 degrees Celsius and more commonly of about 160 degrees Celsius; a critical pressure commonly ranging from about 1 to about 2.25 Mpa and more commonly of about 1.67 Mpa; a solubility of the fluid in water commonly of no more than about 15 ppm by weight and more commonly of no more than about 10 ppm by weight; a solubility of water in the fluid commonly ranging from about 350 to about 500 ppm by weight and more commonly of about 410 ppm by weight; a dielectric strength, 2.54 mm gap, commonly ranging from about 25 to about 40 kV and more commonly of about 31 kV; a volume resistivity commonly ranging from about $1.5 \times 10^{10}$ to about $4.5 \times 10^{10}$ ohm-cm and more commonly of about $3 \times 10^{10}$ ohm-cm; a fluid thermal conductivity @ 25 degrees Celsius commonly ranging from about 0.050 to about 1 W/m-K and more commonly of about 0.0725 W/m-K; a fluid liquid specific heat @ 25 degrees Celsius commonly ranging from about 1250 to about 1500 J/kg C and more commonly of about 1325 J/kg c; and a dielectric constant commonly ranging from about 5 to about 8 and more commonly of about 6.4. Another HFE base solvent that can be employed is 1,1,1,2,3,3-hexafluoro-4-(1,1,2,3,3,3-hexafluoropropoxy)-pentane, which has a vapor pressure @25 degrees Celsius commonly ranging from about 7.5 to about 10 mm Hg and more commonly of about 8.9 mm Hg; boiling point of more than about 100 degrees Celsius and more commonly of about 130 degrees Celsius; an enthalpy of vaporization commonly ranging from about 25 to about 45 kJ/mol and more commonly ranging from about 32.9 to about 38.9 kJ/mol; a flash point commonly of more than about 15 degrees Celsius and more commonly ranging from about 20 to about 75 degrees Celsius; an index of refraction commonly ranging from about 1200 to about 1300 and more commonly of about 1292; a molar reflectivity commonly ranging from about 35 to about 50 $cm^3$ and more commonly of about 42.6 $cm^3$; a polarizability commonly ranging from about $12.5 \times 10^{-24}$ to about $20 \times 10^{-24}$ $cm^3$ and more commonly of about $16.9 \times 10^{-24}$ $cm^3$; and a surface tension commonly ranging from about 10 to about 20 dyne/cm and more commonly of about 15 dyne/cm; a molar volume commonly ranging from about 200 to about 250 cm$^3$ and more commonly of about 233 cm$^3$. The HFE solvent not only can have a high vapor pressure, be aprotic, and have a reasonably high dielectric constant in the presence of fluorinated co-solvents but also are able to dissolve standard lithium salts, particularly LiPF$_6$. Unlike other nonpolar HFE solvents, PF-7600 is able to effectively dissolve polar lithium salts, such as LiPF$_6$.

Commonly, the electrolyte (not including the lithium salt(s)) comprises at least about 25 wt. %, more commonly at least about 30 wt. %, more commonly at least about 35 wt. %, more commonly at least about 40 wt. %, more commonly at least about 45 wt. %, more commonly at least about 50 wt. %, and more commonly at least about 55 wt. % but no more than about 85 wt. %, more commonly no more than about 80 wt. %, more commonly no more than about 75 wt. %, more commonly no more than about 70 wt. %, and more commonly no more than about 65 wt. % HFE solvent(s).

The mixture of solvent(s) can include one or more linear and cyclic carbonate ester co-solvent(s) that can provide enhanced SEI-layer forming on the surface of the active material(s). Ethylene carbonate is a very common solvent for this purpose. Three fluorinated analog solvents are available. Most common is fluoroethylene carbonate (FEC) but the other two DFEC solvents can also be used.

Commonly, the electrolyte (not including the lithium salt(s)) comprises at least about wt. %, more commonly at least about 2.5 wt. %, and more commonly at least about 5 wt. %, but no more than about 30 wt. %, more commonly no more than about 20 wt. %, and more commonly no more than about 10 wt. % SEI-layer-forming co-solvent(s).

The mixture of solvent(s) can include one or more viscosity-lowering linear and cyclic ester co-solvent(s) that can dissolve the SEI-layer forming co-solvent and lower the electrolyte viscosity, thereby increasing the solubility of the lithium salt-component and charge-carrying capacity of the electrolyte and providing more effective performance at low temperatures (e.g., at about 0° C. or lower).

Figure 2:
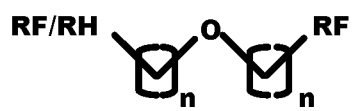
FIG. 2 depicts a chemical structure of a solvent according to some embodiments of the present disclosure.
Figure 3:
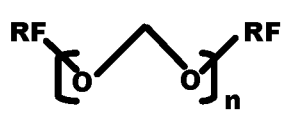
FIG. 3 depicts a chemical structure of a solvent according to some embodiments of the present disclosure.
Figure 4:
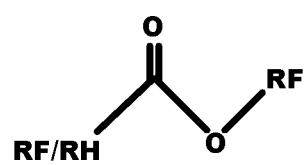
FIG. 4 depicts a chemical structure of a solvent according to some embodiments of the present disclosure.
Figure 5:
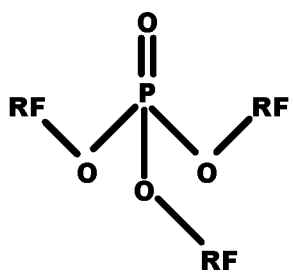
FIG. 5 depicts a chemical structure of a solvent according to some embodiments of the present disclosure.
Figure 6:
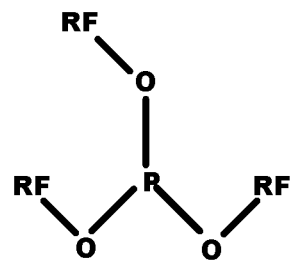
FIG. 6 depicts a chemical structure of a solvent according to some embodiments of the present disclosure.

Solvent families include fluorinated carbonates with the generic formulation of FIG. 1; fluorinated ethers with the generic formulation of FIG. 2; fluorinated polyethers with the generic formulation of FIG. 3; fluorinated esters with the generic formulation of FIG. 4; and fluorinated phosphates and phosphites with the generic formulations of FIGS. 5-6, respectively, where: $R_F$ is a hydrogenated organic carbon chain or other entity that can be saturated (e.g., having no unsaturated sites or carbon-carbon double or triple bonds), unsaturated (e.g., having one or more carbon-carbon bounds that may or may not be in conjugation), or aromatic (e.g., having two or more carbon-carbon bonds that are in conjugation); $R_H$ is a fluorinated organic carbon chain or other entity that can be saturated, unsaturated, or aromatic; and n is the number of repeating units, which is commonly a value between 1 and 3. $R_H$ can have an undefined degree of fluorination; that is, some, most, or all of the hydrogens may be replaced by fluorine. Other viscosity-lowering fluorinated esters of interest include but are not limited to: 2,2,2-trifluoroethyl butyrate (TFEB), trifluoroethyl propionate (TFEP), and methyl pentafluoro propionate (MPFP).

Viscosity lowering co-solvents include dimethyl carbonate (DMC), diethyl carbonate (DEC), ethyl methyl carbonate (EMC), dimethoxyethane (DME), ethoxy methoxy ethane (EME), diethoxyethane (DEE), methyl acetate (MA), ethyl acetate (EA), methyl propionate (MP), ethyl propionate (EP), methyl butyrate (MB), and any of the other organic solvents in Table 1 below. Fluorinated analogs for each of these co-solvents can be substituted in the lithium-ion electrolyte as proposed.

Table 1 lists the physical properties of typical organic solvents and their fluorinated analogs where MW, $\rho$, $\varepsilon$, $\eta$, $E_{homo}$ and $E_{lumo}$ are molecular weight, density, relative permittivity, viscosity and frontier orbital energies, respectively.

TABLE 1

| Abbrev. | Name | MW | $\rho$, g/cc | $\varepsilon$ | $\eta$, mPa s | $E_{homo}$, eV | $E_{lumo}$, eV |
|---|---|---|---|---|---|---|---|
| EC | Ethylene Carbonate | 88 | 1.32 (40° C.) | 90 (40° C.) | 1.9 (40° C.) | −12.86 | 1.51 |
| FEC | 4-Fluoro-1,3-dioxolan-2-one | 106 | 1.5 | 107 | 4.1 | −13.3 | 1.45 |
| DFEC | 4,5-Difluoro-1,3-dioxolan-2-one | 124 | 1.51 | 37 | 2.5 | −13.91 | 1.63 |
| DFEC | 4,4-Difluoro-1,3-dioxolan-2-one | 124 | 1.57 | 34 | 2.1 | −13.70 | 1.56 |
| DMC | Dimethyl carbonate | 90 | 1.06 | 3.1 | 0.59 | −12.85 | 1.88 |
| FDMC | Fluoromethyl methyl carbonate | 108 | 1.24 | 9.0 | 0.92 | −13.25 | 1.79 |
| DFDMC | Bis (fluoromethyl) carbonate | 126 | 1.40 | 14 | 1.4 | −13.68 | 1.80 |
| TFDMC | Difluoromethyl fluoromethyl carbonate | 144 | 1.47 | 11 | 0.99 | −13.75 | 1.76 |
| DEC | Diethyl carbonate | 118 | 0.97 | 2.8 | 0.75 | −12.59 | 1.93 |
| FDEC | Ethyl 2-fluoroethyl carbonate | 136 | 1.12 | 6.5 | 1.3 | −12.80 | 1.86 |
| DFDEC | 2,2-Difluoroethyl Ethyl carbonate | 154 | 1.29 | 6.6 | 1.3 | −13.01 | 1.82 |

TABLE 1-continued

| Abbrev. | Name | MW | ρ, g/cc | ε | η, mPa s | $E_{homo}$, eV | $E_{lumo}$, eV |
|---|---|---|---|---|---|---|---|
| TFDEC | Ethyl 2,2,2-trifluoroethyl carbonate | 172 | 1.33 | 7.1 | 0.93 | −13.11 | 1,80 |
| EMC | Ethyl methyl carbonate | 104 | 1.01 | 3.0 | 0.65 | −12.71 | 1.91 |
| FEMC | 2-Fluoroethyl methyl carbonate | 122 | 1.19 | 7.3 | 1.4 | −12.98 | 1.84 |
| DFEMC | 2,2-Difluoroethyl methyl carbonate | 140 | 1.29 | 9.3 | 2.7 | −13.21 | 1.78 |
| TFEMC | Methyl-2,2,2-trifluoroethyl carbonate | 158 | 1.33 | 7.1 | 0.82 | −13.33 | 1.75 |
| DME | Dimethoxyethane | 90 | 0.86 | 5.5 | 0.46 | −11.49 | 2.02 |
| FDME | Fluoro dimethoxy ethane | * | * | * | * | * | * |
| EME | Ethoxymethoxyethane | 104 | 0.85 | 5.7 | 0.52 | −11.40 | 2.03 |
| FEME | 2-Fluoroethoxy-methoxyethane | 122 | 1.01 | 17 | 1.0 | −11.68 | 1.95 |
| DFEME | 2,2-Difluoro-ethoxymethoxy-ethane | 140 | 1.10 | 17 | 1.1 | −11.88 | 1.87 |
| TFEME | Methoxy-2,2,2-trifluoroethoxy-ethane | 158 | 1.15 | 17 | 0.79 | −11.98 | 1.84 |
| DEE | Diethoxyethane | 118 | 0.84 | 5.0 | 0.60 | −11.36 | 2.05 |
| EFEE | Ethoxy-2-fluoroethoxy-ethane | 136 | 0.97 | 14 | 1.1 | −11.58 | 1.97 |
| EDFEE | 2,2-Difluoroethoxy-ethoxyethane | 154 | 1.05 | 14 | 1.1 | −11.77 | 1.91 |
| ETFEE | Ethoxy-2,2,2-trifluoroethoxy-ethane | 172 | 1.10 | 14 | 0.85 | −11.87 | 1.89 |
| MA | Methyl acetate | 74 | 0.93 | 6.7 | 0.36 | −12.21 | 1.85 |
| MFA | Methyl fluoroacetate | 92 | 1.17 | 18 | 1.2 | −12.58 | 1.71 |
| MDFA | Methyl difluoroacetate | 110 | 1.26 | | | −12.90 | 1.67 |
| EA | Ethyl acetate | 88 | 0.89 | 6.0 | 0.43 | −12.09 | 1.87 |
| EFA | Ethyl fluoroacetate | 106 | 1.09 | 15 | 0.89 | −12.47 | 1.75 |
| 2EFA | 2-Fluoroethyl acetate | 106 | 1.09 | 7.8 | 0.97 | −12.46 | 1.75 |
| EDFA | Ethyl difluoroacetate | 124 | 1.24 | | | −12.78 | 1.73 |
| DFEA | 2,2-Difluoroethyl acetate | 124 | 1.10 | 9.4 | 1.0 | −12.64 | 1.74 |
| TFEA | 2,2,2-Trifluoro-ethyl acetate | 142 | 1.24 | 6.7 | 0.7 | −12.80 | 1.76 |

Other viscosity-lowering fluorinated esters of interest include but are not limited to: 2,2,2-trifluoroethyl butyrate (TFEB), trifluoroethyl propionate (TFEP), and methyl pentafluoro propionate (MPFP).

Commonly, the electrolyte (not including the lithium salt(s)) comprises at least about 10 wt. %, more commonly at least about 12 wt. %, and more commonly at least about 15 wt. %, but no more than about 40 wt. %, more commonly no more than about 30 wt. %, and more commonly no more than about 25 wt. % viscosity-lowering co-solvent(s).

Other optional co-solvents may be included in the solvent mixture of the electrolyte. The other optional co-solvents include sulfone-based compounds (including without limitation ethyl methyl sulfone (EMS) and tetramethyl sulfone (TMS)) and organosilicons (including without limitation silane-based electrolyte solvents such as tris(trimethylsilyl) borate, tris(trimethylsilyl) phosphite and tris(trimethylsilyl) phosphate), which may or may not be fluorinated.

When one or more other co-solvents is included in the formulation, the electrolyte (not including the lithium salt(s)) commonly comprises at least about 0.1 wt. %, more commonly at least about 5 wt. %, more commonly at least about 10 wt. %, and more commonly at least about 15 wt. %, but no more than about 25 wt. %, more commonly no more than about 20 wt. %, and more commonly no more than about 15 wt. % of the other (optional) co-solvent(s).

The solvent mixture can include other additives for improved performance. Optional additives include, for example, a flame retardant to decrease further the flammability of the cell. One family of flame retardants is phosphinine with the generic molecular formula $C_xH_yP_z$. A customized phosphinine, sold under the tradename Hishicolin E™ by Nippon Chemical, is 2-Ethoxy-2,4,4,6,6-pentafluoro-1,3,5,2λ5,4λ5,6λ5 triazatriphosphinine with the following molecular formula: $C_2H_5F_5N_3OP_3$. Such additives are often not needed if the electrolyte uses 100% non-flammable solvents.

When one or more of the other additives is included, the electrolyte (not including the lithium salt(s)) comprises at about least 0.1 wt. %, more commonly at least about 5 wt. %, and more commonly at least about 10 wt. %, but no more than about 25 wt. %, more commonly no more than about 20 wt. %, and more commonly no more than about 15 wt. % (optional) additive(s).

The Lithium Salt(s)

The electrolyte can include one or more lithium salts that are soluble in the solvent mixture. While any lithium salt can be employed, the lithium salt will commonly comprise lithium hexafluorophosphate ($LiPF_6$) salt. The electrolyte can include one or more other lithium salts, such as lithium hexafluoroarsenate ($LiAsF_6$), lithium perchlorate ($LiClO_4$), lithium tetrafluoroborate ($LiBF_4$), lithium triflate ($LiCF_3SO_3$), lithium bis(oxalato)borate (LiBOB), lithium difluoro(oxalato)borate (LiDFOB), lithium methide, lithium bis(fluorosulfonyl)imide (LiFSI), lithium bis(trifluoromethanesulfonyl)imide (LiTFSI), lithium bis(pentafluoroethanesulfonyl)imide (LiBETI), and lithium (nonafluorobutylsulfonyl)(trifluoromethylsulfonyl) imide (LiFBMSI) to enhance SEI layer formation, electrolyte conductivity, high temperature stability, and high voltage stability, provide improved power capability, and/or support reversible metallic lithium anode cycling reversibility, depending on the application. LiTFSi, in particular, can reduce, or inhibit, the formation of hydrofluoric acid and thereby water, which is highly and explosively reactive with lithium.

The total lithium salt concentration commonly ranges from about 0.05 to about 5 M, more commonly from about 0.1 to about 2.5 M, more commonly from about 0.25 to about 2 M, more commonly from about 0.5 to about 1.5 M (based on the molar concentration of the lithium salt). Lithium hexafluorophosphate is commonly at least about 25 mole %, more commonly at least about 30 mole %, more commonly at least about 40 mole %, more commonly at least about 50 mole %, more commonly at least about 60 mole %, more commonly at least about 70 mole %, more commonly at least about 80 mole %, and more commonly at least about 90 mole % of the lithium salts.

In some formulations, the lithium salt is composed entirely of lithium hexafluorophosphate.

In another formulation, the lithium salt comprises, in addition to lithium hexafluorophosphate, at least about 0.1 mole %, more commonly at least about 0.5 mole %, and more commonly at least about 0.9 mole % but no more than about 2.0 mole %, more commonly no more than about 1.5 mole %, and more commonly no more than about 1.2 mole % of one or more of lithium hexafluoroarsenate (LiAsF6), lithium perchlorate (LiClO4), lithium tetrafluoroborate (LiBF4), lithium triflate (LiCF3SO3), lithium bis(oxalato) borate (LiBOB), lithium difluoro(oxalato)borate (LiDFOB), lithium methide, lithium bis(fluorosulfonyl)imide (LiFSI), lithium bis(trifluoromethanesulfonyl)imide (LiTFSI), lithium bis(pentafluoroethanesulfonyl)imide (LiBETI), and lithium (nonafluorobutylsulfonyl)(trifluoromethylsulfonyl) imide (LiFBMSI).

Another formulation comprises lithium bis(trifluoromethanesulfonyl)imide (LiTFSi) in addition to lithium hexafluorophosphate to control hydrofluoric acid formation. This formulation commonly comprises at least about 0.1%, more commonly at least about 0.5%, and more commonly at least about 1.0% but no more than about 5%, more commonly no more than about 2.5%, and more commonly no more than about 1.5% of LiTFSi.

Another formulation comprises lithium bis(oxalate) borate (LiBOB) in addition to lithium hexafluorophosphate to enhance rate capability, particularly at lower temperatures, attributed to improved cathode kinetics. This formulation commonly comprises at least about 0.1%, more commonly at least about 1.0%, and more commonly at least about 1.5% but no more than about 5%, more commonly no more than about 3.5%, and more commonly no more than about 2.5% of LiBOB.

In other formulations, the lithium salts include not only lithium hexafluorophosphate but also one or more of the SEI-layer enhancing and hydrofluoric acid-inhibiting lithium salts.

The Overall Electrolyte Formulation

The electrolyte formulation commonly comprises from about 4 to about 20 wt. % or more commonly from about 6 to about 12 wt. % of the lithium salt(s). Stated differently, the electrolyte formulation commonly comprises from about 80 to about 96 wt. % or more commonly from about 88 to about 94 wt. % of the solvent formulation.

The Active Materials

In addition to being non-flammable, another important benefit of a highly fluorinated solvent system is its enhanced oxidative stability, allowing the use of high voltage cathodes up to about 5.0V and more commonly from about 3 to about 5 volts (with respect to a Li/Li$^+$ reference electrode). These active materials for the cathode include the spinel type materials: $LiM_xMn_{2-x}O_4$ (M=Ni, Fe, Cr, Co) and phospho-olivine type materials: $LiMPO_4$ (M=Co, Mn, Ni, V). Most commonly studied are $LiNi_{0.5}Mn_{1.5}O_4$ and $LiCoPO_4$. As will be appreciated, a layered oxide (e.g., lithium cobalt oxide) or polyanion (e.g., lithium manganese oxide) can also be used as the active material.

Figure 7:
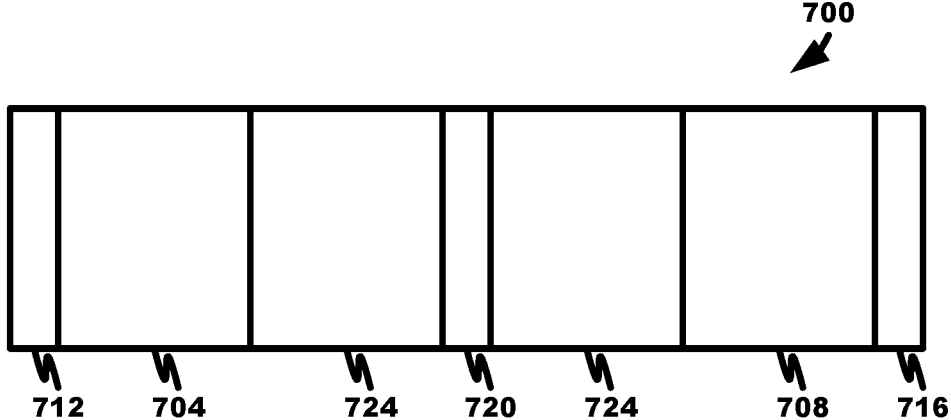
FIG. 7 depicts a battery cell according to some embodiments of the present disclosure.

An exemplary cross-section of the battery cell layer stack-up 700 is depicted in FIG. 7. The cell cross-section 700 includes an anode 704, cathode 708, first current collector 712, second current collector 716 and separator 720. While FIG. 7, for the sake of simplicity, shows the electrolyte 724 as a separate layer in the layer stack-up for the cell, it is to be understood that the electrolyte commonly occupies the pores of the anode 704, cathode 708 and separator 720.

The active material for the anode 704 is commonly carbon-based (e.g., graphite). Recently Si anode and graphite-Si anode composites have been used in lithium-ion cells to increase energy density.

As will be appreciated, each of the cathode 708 and anode 704 is in electrically conductive contact with second and first current collectors 716 and 712, respectively, and the cell 700 commonly comprises an ion-permeable membrane (e.g., a porous polymeric (plastic) film) as the separator 720 between the anode 704 and cathode 708. The first current collector 712 typically includes copper while the second current collector 716 typically includes aluminum.

A number of variations and modifications of the disclosure can be used. It would be possible to provide for some features of the disclosure without providing others.

For example, in one alternative embodiment, the solvent formulation can include one or more other HFE co-solvents, such as those sold under the tradenames Novec™ HFE-7000™, HFE-7100™, HFE-7200™, HFE-7300™, HFE-7500™ and HFE-7700™.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights, which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An electrolyte for a lithium-ion cell, comprising:
   an organic solvent mixture comprising:
   at least about 25 wt. % and no more than about 85 wt. %, based on the organic solvent mixture, of a hydrofluorinated ether base solvent, wherein the hydrofluorinated ether base solvent is 1,1,1,2,3,3-hexafluoro-4-(1,1,2,3,3,3-hexafluoropropoxy)-pentane;
   at least about 2.5 wt. % and no more than about 20 wt. %, based on the organic solvent mixture, of a SEI-layer forming fluorinated cyclic ester co-solvent to form an SEI layer on a surface of one or more of a cathodic active material and an anodic active material; and
   at least about 10 wt. % and no more than about 40 wt. %, based on the organic solvent mixture, of a low-viscosity fluorinated co-solvent having a viscosity that is less than a viscosity of each of the hydrofluorinated ether base solvent and the SEI-layer forming fluorinated cyclic ester co-solvent; and
   a lithium salt dissolved in the organic solvent mixture, wherein the lithium salt comprises at least 50 mol. % of lithium hexafluorophosphate ($LiPF_6$).

2. The electrolyte of claim 1, wherein the SEI-forming fluorinated cyclic ester co-solvent comprises one or more of fluoroethylene carbonate (FEC) and difluoroethylene carbonate (DFEC), and wherein the lithium salt further comprises one or more of: lithium hexafluoroarsenate monohydrate ($LiAsF_6$), lithium perchlorate ($LiClO_4$), lithium tetrafluoroborate ($LiBF_4$), lithium triflate ($LiCF_3SO_3$), lithium bis(oxalato)borate (LiBOB), lithium difluoro(oxalato)borate (LiDFOB), and bis(trifluoromethanesulfonyl)imide (LiTFSi).

3. The electrolyte of claim 1, wherein the low-viscosity fluorinated co-solvent comprises one or more of a fluorinated carbonate having the generic formula of FIG. 1, a fluorinated ether having the generic formula of FIG. 2, a fluorinated polyether having solvent having the generic formula of FIG. 3, a fluorinated ester having the generic formula of FIG. 4, a fluorinated phosphate having the generic formula of FIG. 5, and a fluorinated phosphite having the generic formula of FIG. 6, where $R_H$ is a hydrogenated organic carbon entity, $R_F$ is a fluorinated organic carbon entity, and n is a value ranging from 1 and 3.

4. The electrolyte of claim 3, wherein the low-viscosity fluorinated co-solvent comprises one or more of ethyl 2-fluoroethyl carbonate (FDEC), 2-fluoroethyl methyl carbonate (FEMC), 2,2-difluoroethylmethuyl carbonate (DFEMC), methyl 2,2,2-trifluoroethyl carbonate (TFEMC), ethyl 2,2-difluoroethyl carbonate (DFDEC), ethyl 2,2,2-trifluoroethyl carbonate (TFDEC), 4-Fluoro-1,3-dioxolan-2-one (FEC), 4,5-Difluoro-1,3-dioxolan-2-one, 4,4-Difluoro-1,3-dioxolan-2-one, Fluoromethyl methyl carbonate (FDMC), Bis (fluoromethyl) carbonate (DFDMC), Difluoromethyl fluoromethyl carbonate (TFDMC), Fluoro dimethoxy ethane (FDME), 2-Fluoroethoxy-methoxyethane (FEME), 2,2-Difluoro-ethoxymethoxy-ethane (DFEME), Methoxy-2,2,2-trifluoroethoxy-ethane (TFEME), Ethoxy-2-fluoroethoxy-ethane (EFEE), 2,2-Difluoroethoxy-ethoxyethane (EDFEE), Ethoxy-2,2,2-trifluoroethoxy-ethane (ETFEE), Methyl fluoroacetate (MFA), Methyl difluoroacetate (MDFA), Ethyl fluoroacetate (EFA), 2-Fluoroethyl acetate (2EFA), Ethyl difluoroacetate (EDFA), 2,2-Difluoroethyl acetate (DFEA), 2,2,2-Trifluoro-ethyl acetate (TFEA), 2,2,2-trifluoroethyl butyrate (TFEB), 2,2,2-trifluoroethyl acetate (TFEA), ethyl trifluoroacetate (ETFA), trifluoroethyl propionate (TFEP), methyl difluoro acetate (MDFA), and methyl pentafluoro propionate (MPFP).

5. The electrolyte of claim 4, wherein the low-viscosity fluorinated co-solvent comprises one or more of 2,2,2-trifluoroethyl butyrate (TFEB), trifluoroethyl propionate (TFEP), and methyl pentafluoro propionate (MPFP).

6. The electrolyte of claim 1, wherein the organic solvent mixture comprises at least about 2.5 wt. % and no more than about 10 wt. % of the SEI-layer forming fluorinated cyclic ester co-solvent and at least about 10 wt. % and no more than about 25 wt. % of the low-viscosity fluorinated co-solvent.

7. The electrolyte of claim 1, wherein the lithium salt further comprises one or more of bis(trifluoromethanesulfonyl)imide (LiTFSi), lithium bis(oxalato)borate (LiBOB), and lithium difluoro(oxalato)borate (LiDFOB), and wherein the SEI-forming fluorinated cyclic ester co-solvent comprises fluoroethylene carbonate (FEC).

8. The electrolyte of claim 1, wherein the lithium salt comprises at least 80 mol % lithium hexafluorophosphate (LiPF$_6$) and further comprises one or more of lithium hexafluoroarsenate (LiAsF$_6$), lithium perchlorate (LiClO$_4$), lithium tetrafluoroborate (LiBF$_4$), lithium triflate (LiCF$_3$SO$_3$), lithium bis(oxalato)borate (LiBOB), lithium difluoro(oxalato)borate (LiDFOB), lithium methide, lithium bis(fluorosulfonyl)imide (LiFSI), lithium bis(trifluoromethanesulfonyl)imide (LiTFSI), lithium bis(pentafluoroethanesulfonyl)imide (LiBETI), and lithium (nonafluorobutylsulfonyl)(trifluoromethylsulfonyl) imide (LiFBMSI).

9. The electrolyte of claim 1, wherein the lithium salt further comprises at least about 1 mol. % and no more than about 3.5 mol. % lithium bis(oxalate) borate (LiBOB).

10. The electrolyte of claim 1, wherein the electrolyte comprises from about 4 to about 20 wt. % lithium salts.

11. A lithium-ion cell, comprising:
an anode comprising an anodic active material, the anode being in electrically conductive contact with a first current collector;
a cathode comprising a cathodic active material, the cathode being in electrically conductive contact with a second current collector;
an ion-permeable membrane positioned between the anode and the cathode; and
an electrolyte in contact with the anode and the cathode, the electrolyte comprising:
an organic solvent mixture comprising:
at least about 25 wt. % and no more than about 85 wt. %, based on the organic solvent mixture, of a hydrofluorinated ether base solvent, wherein the hydrofluorinated ether base solvent is 1,1,1,2,3,3-hexafluoro-4-(1,1,2,3,3,3-hexafluoropropoxy)-pentane;
at least about 2.5 wt. % and no more than about 20 wt. %, based on the organic solvent mixture, of a SEI-layer forming fluorinated cyclic ester co-solvent to form an SEI layer on a surface of one or more of the cathodic active material and the anodic active material; and
at least about 10 wt. % and no more than about 40 wt. %, based on the organic solvent mixture, of a low-viscosity fluorinated co solvent having a viscosity that is less than a viscosity of each of the hydrofluorinated ether base solvents and the SEI-layer forming fluorinated cyclic ester co-solvent; and
a lithium salt dissolved in the organic solvent mixture, wherein the lithium salt comprises at least 50 mol. % of lithium hexafluorophosphate (LiPF$_6$).

12. The lithium-ion cell of claim 11, wherein the SEI-forming fluorinated cyclic ester co-solvent comprises one or more of fluoroethylene carbonate (FEC) and difluoroethylene carbonate (DFEC), and wherein the lithium salt further comprises one or more of: lithium hexafluoroarsenate monohydrate (LiAsF$_6$), lithium perchlorate (LiClO$_4$), lithium tetrafluoroborate (LiBF$_4$), lithium triflate (LiCF$_3$SO$_3$), lithium bis(oxalato)borate (LiBOB), lithium difluoro(oxalato)borate (LiDFOB), and bis(trifluoromethanesulfonyl)imide (LiTFSi).

13. The lithium-ion cell of claim 11, wherein the low-viscosity fluorinated co-solvent comprises one or more of one or more of a fluorinated carbonate having the generic formula of FIG. 1, a fluorinated ether having the generic formula of FIG. 2, a fluorinated polyether having the generic formula of FIG. 3, a fluorinated ester having the generic formula of FIG. 4, a fluorinated phosphate having the generic formula of FIG. 5, and a fluorinated phosphite having the generic formula of FIG. 6, where R$_H$ is a hydrogenated organic carbon entity, R$_F$ is a fluorinated organic carbon entity, and n is a value ranging from 1 and 3.

14. The lithium-ion cell of claim 11, wherein the low-viscosity fluorinated co solvent comprises one or more of ethyl 2-fluoroethyl carbonate (FDEC), 2-fluoroethyl methyl carbonate (FEMC), 2,2-difluoroethylmethyl carbonate (DFEMC), methyl 2,2,2-trifluoroethyl carbonate (TFEMC), ethyl 2,2-difluoroethyl carbonate (DFDEC), ethyl 2,2,2-trifluoroethyl carbonate (TFDEC), 4-Fluoro-1,3-dioxolan-2-one (FEC), 4,5-Difluoro-1,3-dioxolan-2-one, 4,4-Difluoro-1,3-dioxolan-2-one, Fluoromethyl methyl carbonate (FDMC), Bis (fluoromethyl) carbonate (DFDMC), Difluoromethyl fluoromethyl carbonate (TFDMC), Fluoro dimethoxy ethane (FDME), 2-Fluoroethoxy-methoxyethane (FEME), 2,2-Difluoro-ethoxymethoxy-ethane (DFEME), Methoxy-2,2,2-trifluoroethoxy-ethane (TFEME), Ethoxy-2-fluoroethoxy-ethane (EFEE), 2,2-Difluoroethoxy-ethoxy-ethane (EDFEE), Ethoxy-2,2,2-trifluoroethoxy-ethane (ET-FEE), Methyl fluoroacetate (MFA), Methyl difluoroacetate (MDFA), Ethyl fluoroacetate (EFA), 2-Fluoroethyl acetate (2EFA), Ethyl difluoroacetate (EDFA), 2,2-Difluoroethyl acetate (DFEA), 2,2,2-Trifluoro-ethyl acetate (TFEA), 2,2,2-trifluoroethyl butyrate (TFEB), 2,2,2-trifluoroethyl acetate (TFEA), ethyl trifluoroacetate (ETFA), trifluoroethyl propionate (TFEP)methyl difluoro acetate (MDFA), and methyl pentafluoro propionate (MPFP).

15. The lithium-ion cell of claim 11, wherein the organic solvent mixture comprises at least about 2.5 wt. % and no more than about 10 wt. % of the SEI-layer forming fluorinated cyclic ester co-solvent and at least about 10 wt. % and no more than about 25 wt. % of the low-viscosity fluorinated co-solvent.

16. The lithium-ion cell of claim 11, wherein the lithium salt further comprises one or more of bis(trifluoromethanesulfonyl)imide (LiTFSi), lithium bis(oxalato)borate (LiBOB), and lithium difluoro(oxalato)borate (LiDFOB), and wherein the SEI-forming fluorinated cyclic ester co-solvent comprises fluoroethylene carbonate (FEC).

17. The lithium-ion cell of claim 11, wherein the lithium salt comprises at least 80 mol % of lithium hexafluorophosphate (LiPF$_6$) and further comprises one or more of lithium hexafluoroarsenate (LiAsF$_6$), lithium perchlorate (LiClO$_4$), lithium tetrafluoroborate (LiBF$_4$), lithium triflate (LiCF$_3$SO$_3$), lithium bis(oxalato)borate (LiBOB), lithium difluoro(oxalato)borate (LiDFOB), lithium methide, lithium bis(fluorosulfonyl)imide (LiFSI), lithium bis(trifluoromethanesulfonyl)imide (LiTFSI), lithium bis(pentafluoroethanesulfonyl)imide (LiBETI), and lithium (nonafluorobutylsulfonyl)(trifluoromethylsulfonyl) imide (LiFBMSI).

18. The lithium-ion cell of claim 11, wherein the lithium salt further comprises at least about 1 mol. % and no more than about 3.5 mol. % lithium bis(oxalate) borate (LiBOB) and wherein the organic solvent mixture comprises from about 4 to about 20 wt. % lithium salts.

19. The electrolyte of claim 1, wherein the SEI-forming fluorinated cyclic ester co-solvent is one or more of fluoroethylene carbonate (FEC) and difluoroethylene carbonate (DFEC), wherein the low-viscosity fluorinated co-solvent is a fluorinated carbonate having the generic formula of FIG. 1, and wherein the lithium salt further comprises one or more of at least about 1 mol. % and no more than about 3.5 mol. % lithium bis(oxalate) borate (LiBOB) and at least about 0.1 mol. % and no more than about 2.5 mol. % lithium bis(trifluoromethanesulfonyl)imide (LiTFSI).

20. The electrolyte of claim 1, wherein the organic solvent mixture comprises at least about 80 mol % of fluorinated solvents.

21. The electrolyte of claim 1, wherein the organic solvent mixture comprises 100 mol % of fluorinated solvents.

* * * * *

UNITED STATES PATENT AND TRADEMARK OFFICE
CERTIFICATE OF CORRECTION

PATENT NO. : 11,233,272 B2  
APPLICATION NO. : 16/561412  
DATED : January 25, 2022  
INVENTOR(S) : Marc W. Juzkow Page 1 of 1

It is certified that error appears in the above-identified patent and that said Letters Patent is hereby corrected as shown below:

In the Claims

Claim 11, Column 13, Line 45, replace "solvents" with --solvent-- therein.
Claim 14, Column 14, Lines 26-27, replace "trifluoroethyl propionate (TFEP)methyl difluoro acetate (MDFA)" with --trifluoroethyl propionate (TFEP), methyl difluoro acetate (MDFA)-- therein.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*